Jan. 7, 1964  R. E. BARBER  3,116,601
STARTING MEANS FOR SUPERSONIC INLET
Filed March 28, 1961  2 Sheets-Sheet 1
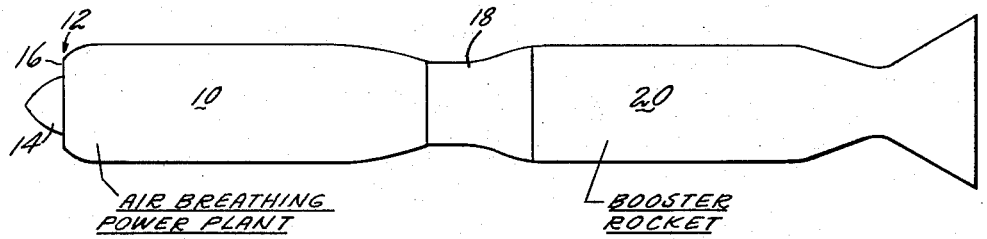
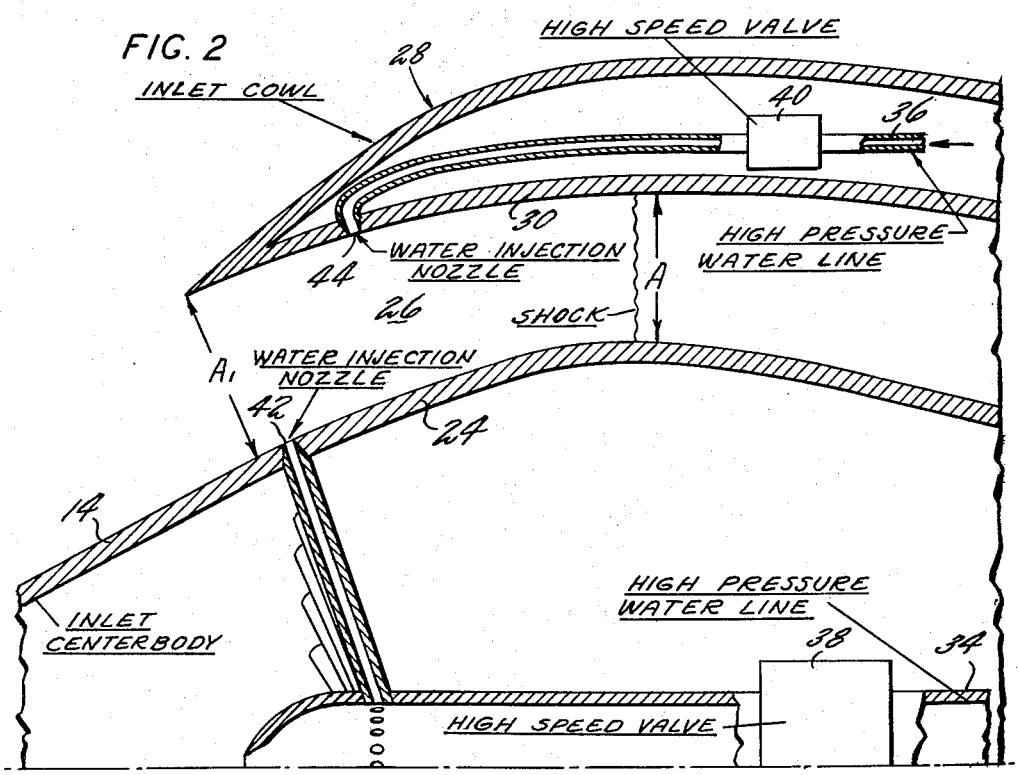
INVENTOR
ROBERT E. BARBER
BY
ATTORNEY

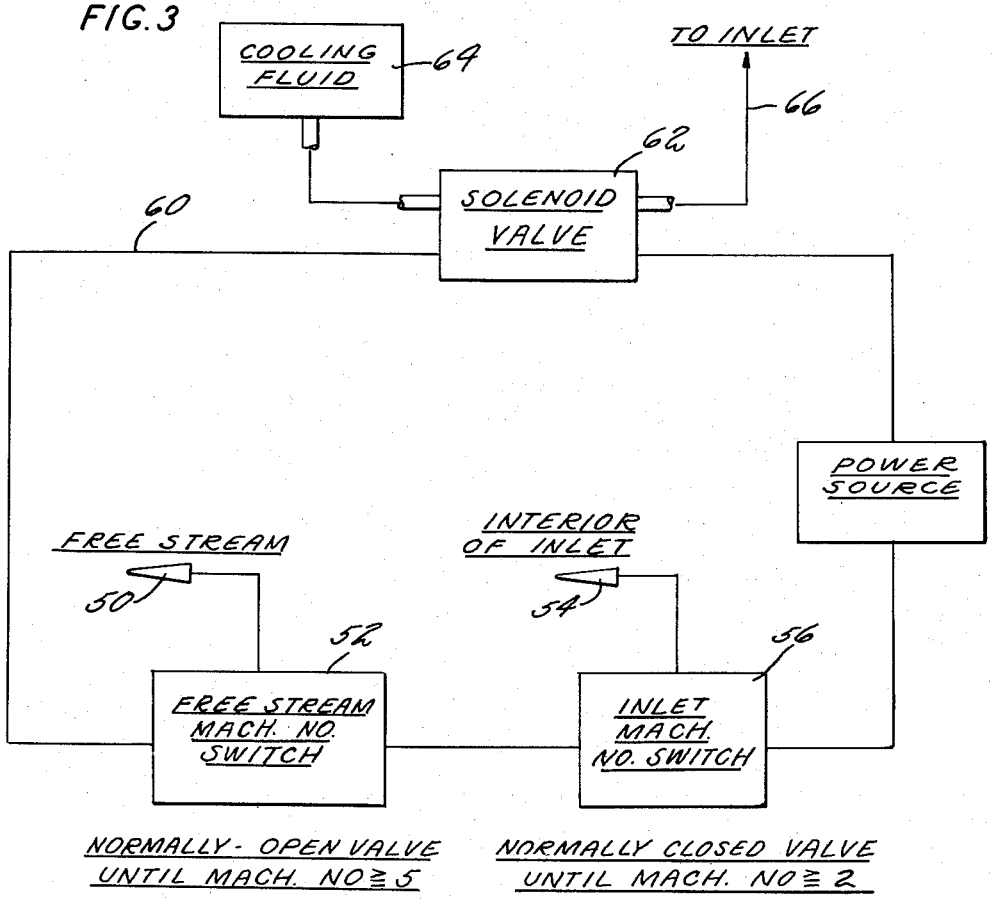

United States Patent Office 3,116,601
Patented Jan. 7, 1964

3,116,601
STARTING MEANS FOR SUPERSONIC INLET
Robert E. Barber, Arvada, Colo., assignor to United Aircraft Corporation, East Hartford, Conn., a corporation of Delaware
Filed Mar. 28, 1961, Ser. No. 98,882
1 Claim. (Cl. 60—35.6)

This invention relates to supersonic or hypersonic inlets and more particularly to means for swallowing the shock or "starting" fixed-geometry internal-compression inlets.

The use of air-breathing power plants in systems operating at Mach numbers above two is limited by inlet performance. There are two general types of supersonic inlets which may be employed, variable-geometry and fixed-geometry inlets. The use of fixed-geometry inlets is desirable because of their lower weight and mechanical simplicity as compared to variable-geometry inlets; however, the performance of a fixed-geometry inlet is generally poorer than the performance of a variable-geometry inlet at the same flight conditions. The performance of fixed-geometry inlets can be improved by internal compression but internal-compression inlets require boosting to a given Mach number before the inlet will "start" (before supersonic flow will be established in the inlet). This invention provides a system which will increase performance of fixed-geometry internal-compression inlets at supersonic speeds.

This invention will increase the performance of an inlet by allowing a particular inlet to "start" at a lower Mach number than it normally would "start" at without this invention, providing reduced booster requirements. If it were desired to "start" the inlet at some fixed Mach number, this invention would provide a higher total pressure recovery by allowing a greater internal compression (contraction ratio) with the inlet utilizing this invention than an inlet without this invention.

A primary object of this invention is to provide a short-duration injection of cooling fluid such as water which is introduced into the inlet airflow before the inlet "starts" (this water is injected upstream of the inlet throat) after the inlet "starts" the water flow is stopped.

A further object of this invention is to provide a simple control which will inject the cooling fluid into the inlet duct when a predetermined Mach number has been reached and then automatically stop the fluid injection after the inlet has been "started."

These and other objects of this invention will become readily apparent from the following detailed description of the drawings in which:

FIG. 1 is a schematic illustration of an air-breathing power plant having a booster rocket connected to the aft end thereof;

FIG. 2 is an enlarged detailed cross-section of a part of a typical supersonic inlet illustrating the coolant injection system of this invention; and FIG. 3 is a schematic block diagram of a typical control system.

Referring to FIG. 1, an air-breathing power plant is schematically illustrated at 10 as having an inlet generally indicated at 12. The inlet includes a conical spike 14 and a forwardly directed opening 16. The power plant 10 includes, among other well-known details (omitted for convenience), an exhaust nozzle 18.

A booster rocket 20 or other suitable power source may be provided to boost the vehicle and the power plant 10 to its "starting" Mach number.

The operating speed of the vehicle or the speed of the relative air approaching the inlet 12 is contemplated as being in the range of Mach No. 5 to Mach No. 10 where this invention will be particularly advantageous.

According to this invention, it is intended that where a fixed-geometry inlet has been designed for a particular Mach number or limited range of Mach number operation it is desirable to be able to "start" the inlet (i.e., to have the shock shallowed), so that supersonic flow is obtained internally of the inlet to a point approximately at the inlet throat. The flow shocks down at this point to a subsonic stream which then flows to the power plant. Once the shock is swallowed or the inlet "started," high pressure recovery is obtained within the inlet. The need for obtaining of high pressure recovery is well known in the art and need not be elaborated on here.

It is the purpose of this invention to inject a small burst or programed amount of coolant such as water into the inlet prior to its attaining its design free-stream Mach number so as to "start" the inlet sooner than could normally be obtained without resorting to variable-geometry configurations. Thus, for example, as seen in FIG. 2, the inlet cone 14 includes a continuing aft portion 24 which forms the inner wall of an annular inlet duct 26. A suitable outer cowling 28 is provided and may support a wall 30 forming the outer wall of the annular duct 26. Although the coolant injection may take a number of suitable forms, as shown herein, inner and outer high pressure water lines 34 and 36 are provided. Any suitable high pressure source may be used. Line 34 includes a high-speed valve 38, while the line 36 includes a high-speed valve 40 which can control the flow of fluid through a number of nozzles 42 and 44, respectively.

The valves 38 and 40 may be operated by a control of the type shown in FIG. 3 so that coolant is injected into the inlet duct 26, and when the shock has been swallowed or the inlet "started," suitable sensing and signal devices will shut off the supply of cooling fluid. The injected water cools the airstream while the state of the water changes to superheated steam. The water injection has the advantageous effect described above because the contraction of the airstream, due to cooling, is greater than the expansion of the water which is turned into steam. This expansion and contraction results in the volume flow of the cooled mixture being less than the volume flow of the uncooled air. The mixture total pressure is also slightly greater than the air total pressure. The effectiveness of this method is dependent on the total temperature of the airstream since no advantage is attained by water injection after the air is cooled to near the water temperature. Therefore, the most advantageous results are attained at hypersonic flight speeds; i.e., at Mach 6.0, altitude of 37,000 ft., the total temperature is approximately 3200 R.

It can theoretically be shown that for a fixed-geometry external-plus-internal-compression inlet designed for "starting" at Mach number 6, with a water injection weight flow of ½ the inlet airflow, i.e., if the airflow in the inlet is 5 lbs./sec., the water injection rate required is approximately 2.5 lbs./sec., the inlet designed for "starting" normally at Mach number 6 can be "started" for example at a Mach number of 5. It is also possible to theoretically show that an inlet designed to "start" at Mach 6 without this invention can be redesigned to utilize this invention (still "starting" at Mach 6) and because of the increased internal contraction allowable the total pressure recovery can be increased, for example, from 49% to 59% with the same injection rate as mentioned above.

FIG. 3 illustrates a schematic block diagram of a control which might be utilized for the water injection system. Thus a probe 50 provides a signal for the free stream Mach number which signal is conducted to a suitable on-off switching device 52. A second probe 54 senses the Mach number in the inlet, and this signal is conducted to a second on-off switching mechanism 56. By example, the switching mechanism 52 is intended to be normally open when the free stream signal is below Mach number 5, while the switching mechanism 56 is intended to be normally closed when the inlet Mach number, for example, is below 2. Thus two conditions must exist before both switches are closed. Hence, when the free stream velocity reaches a Mach number of 5, the switching mechanism 52 will close so that with the switch 56 also closed the circuit or loop 60 will be energized so that a normally closed solenoid valve or other suitable device 62 will be opened. Sudden opening of the valve will permit flow of cooling fluid from the source 64 through the valve 62 and then to the inlet duct via a line 66. Once the shock has been swallowed and the Mach number in the inlet rises, the switch 56 will be opened and the valve 62 will be automatically closed. Thus it can be seen that the water is injected only for a very short period, which may be in the order of one second until the inlet starts and then the supply is cut off. The valve 62 may be spring loaded toward a closed position so that once the flow of current is interrupted the valve will cut the supply of coolant.

Although various schematic devices have been shown in FIG. 3 for detecting the starting of the inlet or the positioning of the shock therein, other sensing devices may be used, as for example, the type shown in Patent No. 2,971,329, issued February 14, 1961, to F. W. Barry and Patent No. 2,971,330, issued February 14, 1961, to J. W. Clark.

Although only one embodiment of this invention has been illustrated and described therein, it will be apparent that various changes and modifications may be made in the construction and arrangement of the various parts without departing from the scope of this novel concept.

What it is desired to obtain by Letters Patent is:

A fixed geometry air inlet adapted to operate in a supersonic airstream and at a given supersonic velocity, means for starting the inlet at a lower supersonic velocity than said given velocity comprising a source of cooling fluid under pressure, a conduit for conducting fluid from said source into the interior of said inlet, fast-acting valve means in said conduit for regulating the flow between said source and the interior of said inlet including first and second switches in series, a first signal generator responsive to the free stream Mach number for controlling said first switch, a second signal generator responsive to the Mach number in said inlet for controlling said second switch, said first switch being normally open until said free stream Mach number reaches a relatively high predetermined value but below said given supersonic velocity, and said second switch being normally closed until said inlet Mach number reaches a predetermined supersonic Mach number below said predetermined Mach number, said first switch closing upon reaching said given Mach number to open said valve means to inject a burst of cooling fluid into said inlet to cause the latter to start, and said second switch opening upon the inlet Mach number reaching said predetermined Mach number to close said valve and cut off said burst of cooling fluid.

References Cited in the file of this patent
UNITED STATES PATENTS

| | | |
|---|---|---|
| 2,870,601 | Demetriades | Jan. 27, 1959 |
| 2,874,537 | Scarborough et al. | Feb. 24, 1959 |
| 2,957,308 | McMurtrey et al. | Oct. 25, 1960 |
| 2,997,843 | Arnett et al. | Aug. 29, 1961 |
| 3,001,364 | Woodworth | Sept. 26, 1961 |
| 3,028,731 | Drake | Apr. 10, 1962 |
| 3,029,600 | Young | Apr. 17, 1962 |